Feb. 20, 1923.	1,445,836.
O. M. A. KOWALSKY.
DOUCHE OR BEDPAN.
FILED MAY 25, 1921.	2 SHEETS—SHEET 2.
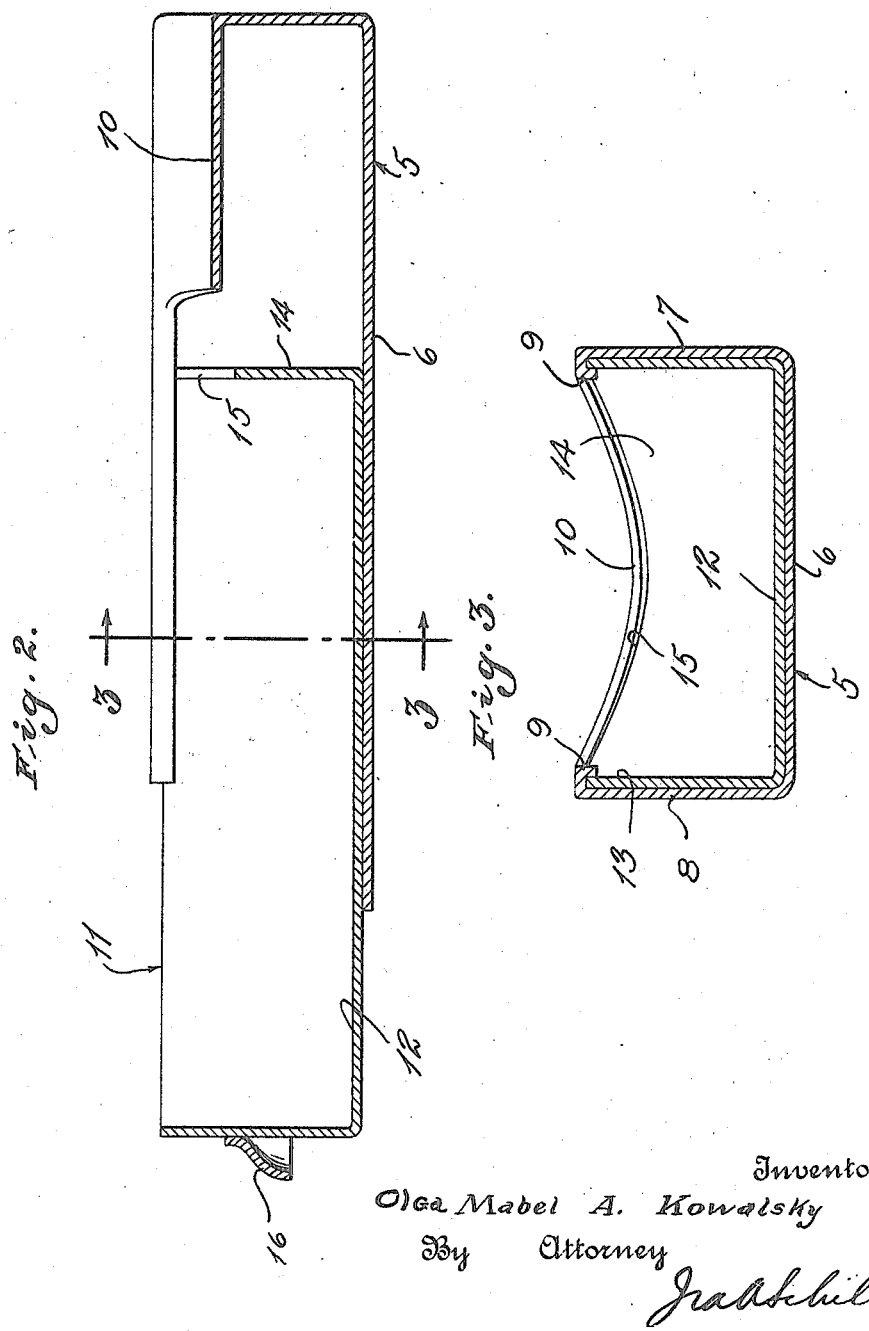
Inventor
Olga Mabel A. Kowalsky
By Attorney Patented Feb. 20, 1923.

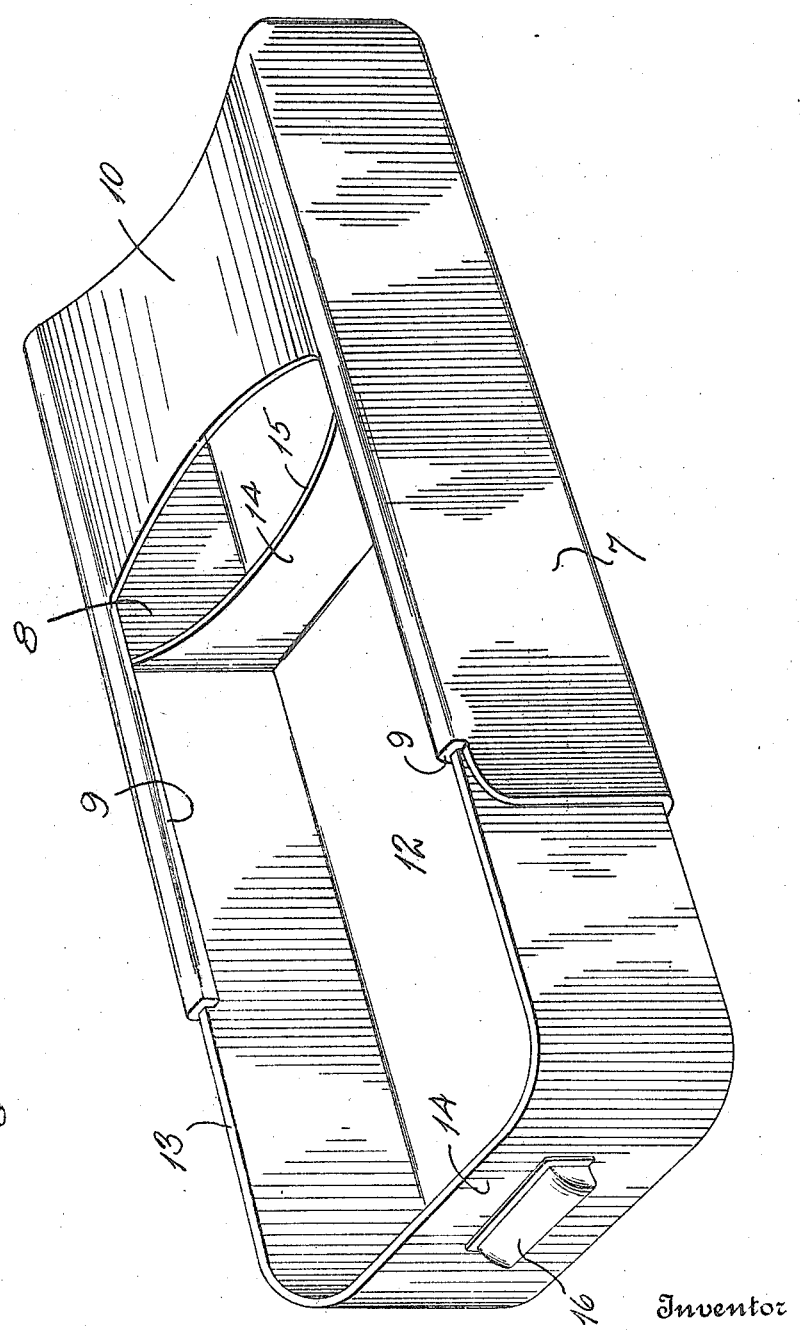

1,445,836

UNITED STATES PATENT OFFICE.

OLGA MABEL A. KOWALSKY, OF NEW YORK, N. Y.

DOUCHE OR BEDPAN.

Application filed May 25, 1921. Serial No. 472,497.

*To all whom it may concern:*

Be it known that I, OLGA MABEL A. KOWALSKY, a citizen of the United States, residing at 42 East 11th Street, New York city, New York, have invented a new and useful Improvement in Douche or Bedpan, the specification of which is hereto annexed and made a part hereof.

This invention relates to improvements in douche or bed pans and more particularly to that type of pan used in the performance of surgical operations and the like.

The principal object of the present invention is to provide a pan of the above nature having a removable basin for catching the residual matter accumulating during an operation which basin may be interchanged without removing the patient from the pan so that where large quantities of water are used sufficient facilities for the proper disposal thereof will be at hand and the inter-changing of the pans may take place without disturbing the patient.

Another object of the invention is to provide a device finding particular value in obstetrical cases wherein the first flow of water may be collected in the basin and a second basin substituted therefor, in which the after birth and other fecal matter may be collected and removed without disturbing the patient.

Still another object of the invention is to provide a device which is equally useful in treating all parts of the body including the head.

A still further object of the invention is to provide a device which may be readily stored in a minimum amount of space by sliding the basin into position beneath the rest.

With these and other objects in view the invention consists in the novel construction, combination and arrangement of parts which will be fully set forth in the following specification claimed, and illustrated in the accompanying drawings in which:—

Figure 1 is a perspective view of this improved douche or bed pan

Figure 2 is a longitudinal sectional view through the device and

Figure 3 is a transverse sectional view on line 3—3 of Figure 2.

Referring to the drawings in detail, the numeral 5 designates in its entirety the outer member or casing of the device which comprises a bottom wall 6 having upturned side walls 7 and 8, the upper ends of which are provided for a portion of their length with guide flanges 9. The remaining portion of the space between the upper edges of the side walls is bridged by a rest 10 upon which the portion of the body of the patent being operated upon is supported.

The basin for catching the waste or discharge matter is designated in its entirety by the numeral 11 and comprises a bottom 12 having the side and end walls 13 and 14 and the inner end wall is cut away as at 15 so that the basin may be slid wholly into the space between the side walls 7 and 8, heretofore described. In order to provide a means for withdrawing the basin, a handle 16 is arranged on the front wall.

In use it will be seen that the upper edges of the side walls 13 are received in the troughs formed between the flanges 9 and walls 7 and 8, and that the basin may be withdrawn from its position within the casing and other basins substituted therefor.

Obviously the emptying of the basin is greatly facilitated and injury or discomfort to the patient due to excessive movement is eliminated as once the pan is placed in position, it is unnecessary to remove the same until the operation is entirely completed and in this manner many discomforts suffered by the use of the ordinary type of pan are eliminated.

While in the foregoing there has been shown and described the preferred embodiment of the invention, it is to be understood that certain minor changes in the details of construction, combination and arrangement of parts may be resorted to without departing from the spirit and scope of the invention as claimed.

What I claim is:—

A bed pan comprising a casing having a bottom and side walls, an end wall connecting the side walls at one end of the casing, an inwardly arched rest connecting the upper edges of the side walls adjacent the end wall, guide flanges at the upper edges of the side walls between the inner edge of the rest and the ends of the side walls, said flanges cooperating with the inwardly curved portions of the rest to form continuous guide ways, and a basin adapted to fit within the casing, the upper edges of the sides of the basin being slidable in the guide ways.

Signed at New York, in the county and State of New York, this 19th day of May 1921.

OLGA MABEL A. KOWALSKY.